(12) United States Patent  
Malina et al.

(10) Patent No.: US 8,952,568 B2  
(45) Date of Patent: Feb. 10, 2015

(54) CONVEYOR SYSTEM FOR CONVEYING INDIVIDUAL PIECE GOODS

(75) Inventors: Georg H. Malina, Wermelskirchen (DE); Werner F. Spaeth, Bad Zurzach (CH)

(73) Assignees: Interroll Holding AG (CH); Sew-Eurodrive Gmgh & Co. KG (DE)

( * ) Notice: Subject to any disclaimer, the term of this patent is extended or adjusted under 35 U.S.C. 154(b) by 104 days.

(21) Appl. No.: 13/203,224

(22) PCT Filed: Feb. 23, 2010

(86) PCT No.: PCT/EP2010/052293  
§ 371 (c)(1),  
(2), (4) Date: Nov. 2, 2011

(87) PCT Pub. No.: WO2010/097391  
PCT Pub. Date: Sep. 2, 2010

(65) Prior Publication Data  
US 2012/0046784 A1    Feb. 23, 2012

(30) Foreign Application Priority Data  
Feb. 24, 2009   (EP) ................................... 09002554

(51) Int. Cl.  
*G06F 7/00* (2006.01)  
*G05B 19/418* (2006.01)

(52) U.S. Cl.  
CPC .. *G05B 19/4189* (2013.01); *G05B 2219/33208* (2013.01); *G05B 2219/45054* (2013.01)  
USPC ............................................ 307/83; 700/230

(58) Field of Classification Search  
USPC .......................................................... 700/230  
See application file for complete search history.

(56) References Cited

U.S. PATENT DOCUMENTS

| 5,341,280 | A | * | 8/1994 | Divan et al. ..................... 363/37 |
| 5,927,657 | A |   | 7/1999 | Takasan et al. |
| 7,222,738 | B1 | * | 5/2007 | Stockard ....................... 209/552 |
| 7,360,638 | B2 | * | 4/2008 | Ko et al. ........................ 198/575 |
| 7,490,024 | B2 | * | 2/2009 | Marzaro et al. ............... 702/188 |
| 2002/0125939 | A1 | * | 9/2002 | Derks ............................ 327/552 |
| 2002/0185358 | A1 | * | 12/2002 | Zeitler et al. ............. 198/370.02 |
| 2003/0218550 | A1 |   | 11/2003 | Herrmann |

(Continued)

FOREIGN PATENT DOCUMENTS

| DE | 197 22 453 C1 | 10/1998 |
| DE | 199 51 506 A1 | 5/2001 |

(Continued)

*Primary Examiner* — Gene Crawford  
*Assistant Examiner* — Lester Rushin  
(74) *Attorney, Agent, or Firm* — Kilpatrick Townsend & Stockton LLP; James K. Chang, Esq.

(57) ABSTRACT

The invention relates to a conveyor system for conveying individual piece goods, comprising: a number of conveyor motors and at least one control unit for sending data connected to each conveyor motor for regulating and/or controlling the conveyor motors. According to the invention, the control unit is connected with a bus line, a conveyor motor, and preferably each conveyor motor by means of the bus line, preferably without electrical contact. According to the invention, it is also provided that the modem(s) is/are designed in order to take energy for driving the conveyor motor and at least one data signal for control/regulation of the conveyor motor from the bus line and send them to the conveyor motor.

25 Claims, 6 Drawing Sheets

(56) References Cited

U.S. PATENT DOCUMENTS

Figure 1:
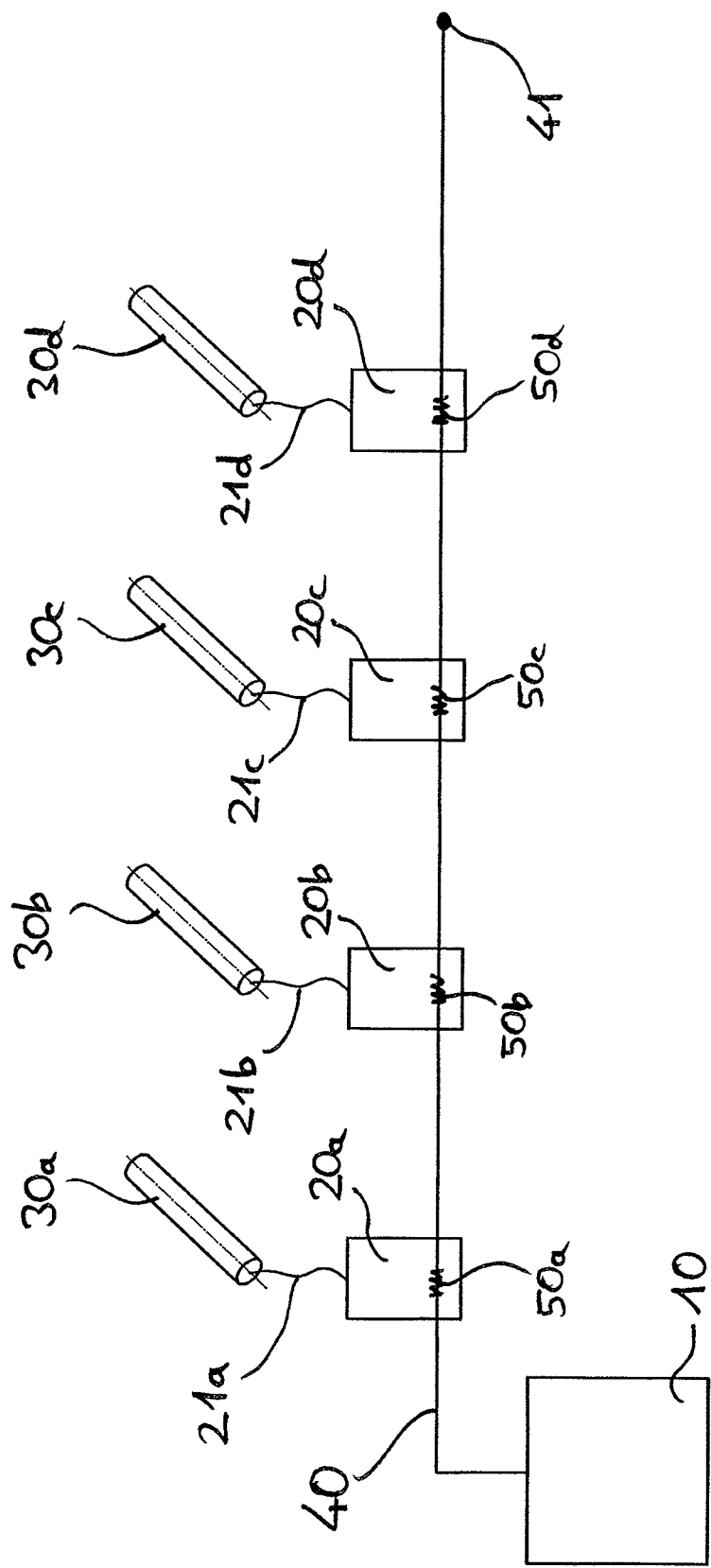

2006/0060446 A1* 3/2006 Springmann ............... 198/347.1
2006/0155420 A1* 7/2006 Katayama ..................... 700/230
2007/0021964 A1* 1/2007 Maenishi et al. .................. 705/1
2008/0133051 A1* 6/2008 Wallace et al. ............... 700/230

FOREIGN PATENT DOCUMENTS

| EP | 0 275 992 A | | 7/1988 | |
| EP | 0605455 B1 | * | 8/1992 | ........... H01R 13/719 |
| EP | 1103496 A2 | * | 10/2000 | ............. B65G 39/00 |

* cited by examiner

CONVEYOR SYSTEM FOR CONVEYING INDIVIDUAL PIECE GOODS

CROSS-REFERENCES TO RELATED APPLICATIONS

This application is a National Stage of International Application No. PCT/EP2010/052293, filed Feb. 23, 2010, and which claims the benefit of European Patent Application No. 09002554.5, filed Feb. 24, 2009, the disclosures of which are incorporated herein by reference.

The invention relates to a conveyor system for conveying individual piece goods, comprising: a number of conveyor motors and at least one control unit that, for sending data, is connected to each conveyor motor for regulation and/or control of conveyor motors. Another aspect of the invention is an energy supply and data transfer device for such a conveyor system and a method for conveyance of piece goods.

Conveyor systems of the type mentioned above are used both in industrial conveyor technology, for example in manufacturing systems, as well as in warehousing, in distribution systems, for example postal or package distribution or package logistics, in order to logistically handle piece goods of different sizes and weight, i.e. especially for storage and for conveyance. A typical structure of such a conveyor system comprises a number of conveyor motors, which are arranged in several conveyor lines or conveyor sections in order to convey items located there. Because of a stringing together of several conveyor lines with branches and junctions on one level and at the same time, also a conveyance of piece goods in different vertical levels, conveyor systems can be combined in this way, which then correspond to the individual needs of demanding logistics tasks.

On one hand, conveyor systems of this type are classified and laid out according to the size and of the weight of the piece goods to be conveyed/stored in them. The energy supply, but also the safety precautions and the sensors that have to be provided for detecting piece goods in the individual line sections, must be adjusted to the size and the weight of the piece goods to be conveyed. This adaptation is especially problematic when, in one conveyor system, piece goods in different weight classes, i.e. piece goods with weights that differ by one or more orders of magnitude, will be conveyed or the sensors for detection of the piece goods must be of different types within one conveyor system in order to detect the different piece goods conveyed in the conveyor system. Typically, different piece goods in such conveyor systems are especially standardized shipping boxes with different lengths and heights, pallets, but also, for example, packages with specific minimum or maximum dimensions.

Depending on the applications, different safety requirements must be fulfilled for conveyor systems of the construction type named above. So, for example, in conveyor systems that are used for the conveyance of sensitive products, e.g. those that are fragile or are subject to negative functional effects due to impacts, it is necessary to ensure operation of the conveyor system using suitable sensors and safety precautions in the control technology of the conveyor system, in which the piece goods can be conveyed without contact, but at least free from impacts and/or shaking. In conveying tasks in the area of the food industry, cleanroom technology or, for example, laboratory technology requirements must in turn be fulfilled with respect to of the structure of the conveyor system that prevent soiling, an occurrence of soiling and the formation of germ or contamination locations critical for this application. For this purpose, good cleaning options are especially required for conveyor systems for these areas which make an appropriately simple geometric structure necessary.

While in some cases these very different requirements cause the creation of conveyor systems that are adapted and individualized to a great extent, there is an effort in the course of the streamlining that is the goal in principle in the area of logistics, conveyor and storage technology, to considerably reduce and simplify the installation or retrofit times as well as in operation and in the installation or changeover of conveyor systems in order to have them performed quickly by personnel who do not require extensive training, in order to carry out the installation and/or retrofit. For this reason, simultaneously—and in a design contradiction—with the fulfillments of individual requirements of conveyor systems that is the goal, there is also an effort to simplify the structure of conveyor systems to an extent that makes this simplified installation and retrofit possible.

From DE 102004038135 a zone-controlled conveyor system is known with a zone control that especially addresses the problem that articles that will be conveyed with the conveyor system must be stopped precisely. For this purpose, a specific zone control is suggested that will prevent the slipping of the article on the conveyor bed by slowing the conveying speed in advance of a stopping procedure. This zone control is implemented using a number of sensors and individual control units, each of which cooperates individually with an individual conveyor motor of a zone. The individual zone controls are connected to each other with multi-core signal lines in order to be able to communicate the transfer of products from one zone to an adjacent zone so that the zone controls provided in each zone can take over the articles coming into the zone. However, a disadvantage of this device is that the number of control zones necessary for a secure operation of the conveyor system makes the system overall more cost-intensive. In addition because of the required signal technology, connection of each of the adjacent zone controls to each other creates a considerable effort required for cabling during installation and at each retrofit, which also makes the conveyor system more cost-intensive with respect to installation and retrofit and additionally more sensitive to installation errors. Another disadvantage of the zone-controlled conveyor system according to this state of the art lies in that for each conveyor motor an individual energy supply must be provided, which requires a complicated structure and complicated cabling, especially if conveyor motors with different performance levels and corresponding different demands of the energy source (for example different electrical voltages as an energy source) are used, and a complicated structure and complicated cabling are also required on the energy supply side.

A first goal of the present invention is to provide a conveyor system that is simpler to set up and change over with respect to installation and retrofit and makes such a setup and/or changeover in a shorter period of time possible.

Another goal of the invention is to provide a conveyor system that can be adapted to individual requirements of a logistics task with less effort than known conveyor systems. In the scope of this object, the goal of the invention is especially to provide a conveyor system which makes it possible to connect different sensors and conveyor motors of different power classes in a simple way. In addition, in this scope the goal of the invention is to provide a conveyor system that can be used both for logistics tasks of smaller scope and for logistics tasks of larger scope and, in the ideal case, can be expanded in order to retrofit a conveyor system of smaller scope to a conveyor system of larger scope.

Another goal of the invention is to provide a conveyor system that is suitable both for the conveyance and storage of heavy piece goods, as well as for the conveyance and storage of lighter piece goods and also especially in environments in which higher, or the highest, requirements are set for hygiene, for example in the area of food technology or cleanroom technology.

According to the invention, these and other goals of the invention are achieved with a conveyor system of the type named at the beginning in which the control unit is connected to a bus line, a conveyor motor, and preferably each conveyor motor, is connected by means of a modem with the bus line, and preferably with a modem for each, preferably connected electrically without contact, and that the modem(s) is/are designed in order to take energy for driving the conveyor motor and at least one data signal for the control/regulation of the conveyor motor from bus line and send them to the conveyor motor.

According to the invention, a new type of architecture for the data and signal line between the conveyor motors and a single, but possibly also several control units, are suggested. The backbone of this new architecture is a bus line that can be used by a number of conveyor motors, on one hand to send data or signals, for example regarding the status of the conveyor motors from the conveyor motor to the control unit and/or to receive data or signals from the control unit that are required for the control/regulation of the conveyor motors.

In principle, the control unit is designed as the master and can thus send and receive data. Depending on the type of peripheral devices, the modems that connect them can be designed as slave, as nodes with receive authorization only, or as master. In the latter case, the bus architecture is designed as multi-master bus and preferably has a decentralized, event-dependent bus switching. Alternatively, central, for example cycled, bus switching can be provided.

Here the bus line is typically designed as a serial bus line, especially as a data line formed of two conductors insulated electrically from each other, between which an alternating voltage is applied. Any data or signals to be sent by way of this bus line can be modulated by a modulating process into this alternating voltage, especially in that the frequency modulation of the alternating voltage occurs, or by modulation of another alternating voltage frequency sent to the alternating voltage. According to the invention, in this way the data or signals input in the bus line are taken from the bus line and/or fed into it by modems. This removal/infeed procedure can especially occur in that the modem is designed in order to take coded data sets, which, e.g., may be control or regulation signals, in a specific manner from the alternating voltage frequencies present in the bus line due to modulation. In this case, the modem is also especially designed in order, with the use of an addressing block, which typically precedes a data package sent over the modem line, to determine by appropriate decoding whether the data package is intended for that peripheral device, i.e. especially a conveyor motor, which is connected to the bus line by means of the modem. In an appropriate manner, the modem provides the data packages fed into the bus line with such an addressing block that identifies the sender. An addressing block can represent an individual address, which addresses only one isolated peripheral device within the conveyor system, or can represent a group address that addresses several such peripheral devices, for example several adjacently arranged conveyor motors of one conveyor line.

With this new architecture, the conveyor system according to the invention provides a significant advantage in comparison to known conveyor systems. In the conveyor system according to the invention, this architecture makes it possible to avoid a situation in which each conveyor motor is connected by way of an individual signal line directly to a control unit, which considerably reduces and simplifies the effort for cabling during initial installation and each retrofit of the conveyor system. This is because, instead of such a direct signal line connection, in the conveyor system according to the invention each conveyor motor only has to be connected to the bus line by means of a short signal line section, especially by a cable, but can also occur without a cable by using a wireless signal transmission, for example a radio path.

Another characteristic of the conveyor system according to the invention lies in that the modem is not only designed in order to take at least one data signal for control/regulation of the conveyor motors from the bus line, but also to take the energy from the bus line required for driving the conveyor motors and send it to the conveyor motor. Because of this, a differentiated double use of the bus line is achieved, which significantly further reduces the cabling effort of conveyor systems. The energy conduction through the bus line required for this purpose can in turn occur by using the two previously mentioned conductors electrically insulated from each other. On these two lines, a high frequency alternating voltage is applied that is higher than the voltage required as operating energy by the conveyor motors and that is required by the conveyor motors as an energy source. This alternating voltage can be taken in an appropriate manner from the bus line by the modems, can be changed hereby or subsequently inside the modem, for example with respect to its frequency and/or voltage, and especially also rectified into a direct voltage in order to then conduct it to the conveyor motor. In this case, the modem is especially designed in order to provide this operating energy to the conveyor motor independently of the data signals, which is above that which is sent in the data signals in the bus line.

Although the bus line has been described above as preferably a serial bus line containing exactly two conductors that are electrically insulated from each other, it has to be understood that the bus line can also comprise more than two line sections routed within the bus line, electrically insulated from each other and/or can be designed as parallel bus lines, in order in this way to be able to conduct higher bandwidth and/or energy quantities. Preferably the bus line is designed as a ring line, which consists of two conductors that run in parallel. The two conductors can be electrically connected to each other, especially at a bus line end and in this case, represent a feed and a return line.

According to the invention it is preferably provided that two or more conveyor motors, and especially all the conveyor motors within the conveyor system, are connected to modems for each conveyor motor and this number of conveyor motors is controlled/regulated by a single control unit. This means a centralized bus architecture, which is especially advantageous with respect to energy distribution and with respect to the data line. It must be understood that this preferably supplied architecture does not rule out the provision of other architectures if there are specific requirements for conveyor systems or if certain orders of magnitude of the conveyor system are exceeded. On one hand, these other architectures consist in that individual peripheral devices, for example specific sensors, actuators or conveyor motors, are not connected to the control unit by way of the bus line, but rather in another manner, especially in a conventional manner by direct connection by means of a separate energy line and data line. This can be required especially if, because of a specific characteristic, the peripheral device is not suitable for being connected by means of a modem to the bus line. In addition, this preferred architecture design does not rule out providing more than one control unit in other designs of the conveyor system according to the invention. For example, a conveyor system can be divided into two conveyor system areas and an individual control unit can be provided for each conveyor system area. In a corresponding manner, several such conveyor system areas can each be provided with a control unit.

Alternatively, or in addition to this, two control units can also be provided for a conveyor system area and/or a conveyor system, which perform different control activities, for example a specific control unit to provide collision prevention between individual piece goods and a control unit that is designed to carry out the conveyance of the piece goods from a starting address to a target address. However, it is especially preferred if all logic functions (i.e., especially all control and regulation functions) are combined in a single control unit and any other control units are used only to feed energy into the bus line and in this way minimize energy consumption and line losses and/or to minimize the required line cross sections. In this case, both and/or all control units can use one and the same bus line for data transfer. In this way, a modular structure of the conveyor system with respect to its characteristics can also be achieved, which makes possible the adaptation of the conveyor system to the individual requirements in each case.

The bus line according to the invention preferably has a medium or high frequency alternating voltage applied, i.e. especially an alternating voltage of more than 1 kHz, preferably more than 10 kHz and especially an alternating voltage of 25 kHz. In this case, the peak voltage in the bus line is preferably greater than the supply voltage of the consumers to be supplied by way of the bus line and especially lies one or two orders of magnitude above this supply voltage.

According to a first preferred embodiment, the conveyor system according to the invention can be further developed with at least one sensor for detecting an item in an area of the conveyor system, which for sending the sensor data is connected to the control unit by way of a modem, which is designed in order to couple at least one sensor signal into an alternating voltage applied to the bus line or to modulate to this alternating voltage.

In this further development, a sensor is provided for detecting an item in a specific area of the conveyor system. In the same way as in the previously explained conveyor motors, this sensor is connected by means of a modem to the bus line and conducts its sensor signals by way of the bus line to the control unit. In this case, the sensor can also especially draw the feed voltage or other forms of energy required for the function of the sensor from the bus line. In particular, it is especially provided that the sensor is connected to the bus line exclusively by way of the modem and no other data or energy lines are required to operate the sensor. In this case, sensor is especially understood to mean a sensor that provides a binary signal in the form of a confirmation or negation of the presence of an item in a specific area of the conveyor system. Sensor is also understood to mean a measuring or a reading unit, which can detect characteristics or codes of piece goods, for example the weight of an item, specific dimensions of the item, or a marking placed on the item, which identifies the item individually and makes possible an identification of the item.

This design can be further developed in that at least one of the modems, and preferably all modems, is/are designed in order to take the energy for the drive and at least one data signal for control/regulation of the conveyor motor from the bus line and in order to couple at least one sensor signal, and preferably several sensor signals, to an alternating voltage applied to a bus line or to modulate to this alternating voltage.

In this preferred embodiment a modem that is used for the connection of a conveyor motor to the bus line is also designed to connect a sensor, and preferably two or more sensors, to the bus line. This type of modem designed with multiple functions especially offers the advantage that peripheral devices with functions that typically occur in combination in a locally limited area of a conveyor system can be connected to the bus line by way of a single modem, making possible a cost-effective and efficient architecture for achieving these functions in the locally limited area.

It is also preferable for the bus line to be designed as a serial bus line and especially comprising two line sections electrically insulated from each other, by which the drive energy can be supplied to the conveyor motor and that a modem is designed for connection of the conveyor motors to the bus line in order to tap the drive energy required for the conveyor motor from the two line sections electrically insulated from each other by inductive coupling to an alternating voltage applied to the line sections and to read out the signals modulated to the alternating voltage in the line sections required for the control and/or regulation of the conveyor motors.

With this type of design of the bus line and the respective modem, an especially reliable and efficient energy and data transmission is implemented that can especially also be designed without electrical contact, which considerably simplifies installation and retrofit procedures on the conveyor system.

According to another preferred embodiment, it is provided that a modem that connects an electronically commutated conveyor motor to the bus line is provided with a commutation and control unit that is designed to generate signals for commutation of the conveyor motor from a rotational angle signal received from the conveyor motor and if necessary from the control signals read out from the bus line for the conveyor motor signals for the commutation of the conveyor motor and that the modem is designed in order to feed status signals, which characterize an operating state of the conveyor motor, especially its speed and/or load status, into the bus line. According to this design, the commutation control for an electronically commutated conveyor motor is arranged inside the modem, which causes an advantageous bundling of all logic and control technology procedures within the data line architecture. In this case, the signals required for the commutation control are exchanged between modem and conveyor motor, i.e. especially a rotational angle signal received from the conveyor motor and corresponding commutation signals sent to the conveyor motor. With commutation control units arranged inside the modem status signals that describe the operating state of the conveyor motors can also especially be derived and sent to the control unit. In the simplest form, these status signals can only describe in binary form whether the conveyor motor is moving or not moving, but can also especially contain more detailed information, for example the rotation speed or even the angular position of the conveyor motor. It must be understood that this design also includes embodiments, in which a universal commutation control unit that adapts itself or can be adapted to different types of conveyor motors is provided in a modem which is designed in such a way that using a code sent from the conveyor motor or using code data manually input in the modem, the commutation control can be adapted to the respective conveyor motor, for example depending on the number of terminals of the conveyor motor or the like.

Alternatively to the previously named embodiment, the conveyor system according to the invention can also be further developed in that the conveyor motor is electronically commutated, a commutation control is assigned to each control motor and mounted directly on the conveyor motor, which receives a speed signal from the control unit, and the modem is designed in order to read the speed signal out from the bus line and supply it to the commutation control. In this design, the commutation control is mounted in the immediate area of the motor and data relevant for the commutation control, for example the rotational angle signal, does not have to be sent to the modem for the purpose of the commutation control, but rather can be sent directly within the conveyor motor to the commutation control, processed there and converted into commutation signals. It must be understood that while on an individual conveyor motor either this type of commutation control can be provided on the motor or the previously named type of commutation control can be provided in the modem, within the conveyor system according to the invention, both types of commutation control can be present for different conveyor motors, in that a first conveyor motor is controlled by means of the commutation control unit mounted inside the model and a second conveyor motor is controlled by means of a commutation control unit mounted on the conveyor motor, the modem of which then has no such commutation control unit and is also designed for a correspondingly different data and signal lines between modem and conveyor motor.

The conveyor system according to the invention can continue to be further developed by using a configurable modem that has a coupling part that is designed to read out energy and signals from the bus line and feed signals into the bus line and has a configurable connecting part that is configurable in order to bring the energy and/or the signals for a consumer or sensor into the form required by it. Such a configurable modem is especially used to integrate a consumer or sensor, i.e. any peripheral device that records data within the conveyor system or causes an item to be conveyed or guided within the conveyor system into the conveyor system. Because of the number of peripheral devices and their tasks and construction types that are different in some cases, it is especially advantageous if such a configurable modem, for example with respect to the voltage level that is drawn from the bus line for operation of the peripheral device can be adapted to the peripheral device. In many applications, it is alternatively or additionally advantageous, if the signals sent to the peripheral device can also be configured in order, for example, to be able to adapt them to a voltage range provided by the peripheral device and/or in order to also be able to convert signals received from the peripheral device and feed them into the bus line if these have a specific voltage range that deviates from the usual voltage range. In this case, the configuration of the modem can occur using manual intervention on the modem itself. However, it can also occur in automated form, in that the modem recognizes, using a code coming from the peripheral device, in which way it must be configured in order to communicate with this peripheral device and recognizes in what form this peripheral device requires energy and the modem then configures itself using this code.

It is also preferable if the configurable modem is designed in order to tap electrical energy from the bus line and has an actuating element in order to adjust the voltage of this electrical energy and/or that the configurable modem is designed in order to take a data signal from the bus line and has an actuating element in order to adjust the voltage range and/or frequency range of this data signal. This type of further-developed configurable modem is especially suitable for being adapted to the needs of different peripheral devices and integrating them into the conveyor system. The configurable modem further developed in this way is especially suitable for connecting peripheral devices according to the state of the art to the conveyor system according to the invention and hereby realizing the advantages according to the invention without modifications having to be made to the peripheral device itself.

It is still further preferred, if the configurable modem is connected inductively to the bus line for transferring the drive energy of the conveyor motor and the effective coupling length of the inductive coupling can be modified in order to adjust the voltage of the drive energy inductively transferred from the bus line. With this further development, an especially reliable connecting method of the configurable modem to the bus line is provided and an advantageous design is provided with this type of connection in order to adjust the voltage of the drive energy transferred inductively from the bus line with respect to its voltage level.

According to another preferred embodiment, it is provided that the modems are connected inductively to the bus line for transferring the drive energy of the conveyor motor, and the inductive coupling of a first modem for transferring an electrical drive energy with a first voltage and the inductive coupling of a second modem for transferring an electrical drive energy with a second voltage, different from the first one. This preferred embodiment of the invention makes it possible to operate conveyor motors with different power levels and different nominal voltages within one conveyor system and hereby to supply the different conveyor motors with the required drive energy by way of a single bus line, and especially a single serial bus line with exactly two line sections contained in it that are electrically separated from each other.

According to another preferred embodiment at least two, and preferably more, control units are provided, each of which is connected by way of its own bus line with several conveyor motors and connected to each other for controlling the conveyor system by means of one control data line. According to this further development, the conveyor system according to the invention can be divided into several conveyor system areas, each of which is controlled/regulated by one control unit. The several conveyor system areas hereby coordinate the conveyance of piece goods from one conveyor system area to another conveyor system area using a communication of the respective control units with each other via the control data line. In principle, the control data line can be a separate data line or it can be designed in the form of the bus line, which in this case is guided by several control units. In this case, in addition to the individual addressing of the individual conveyor motors and possibly other peripheral devices, an assignment of a group of peripheral devices to one control unit each is required in order to operate the conveyor system.

This embodiment can also be further developed, in that the at least two, and preferably several control units are designed in order to exchange the control data line signals that relate to an item that is conveyed from an area of the conveyor system controlled by a first control unit to a second area controlled by a second control unit of the conveyor system. With this further development, a secure transition of an item from a first conveyor system area that is controlled by the first control unit to a second conveyor system area that is controlled by the second control unit is achieved, and at the same time, a division of the control processes to the two control units is achieved that is especially advantageous for the fast processing of control data.

According to another preferred embodiment, a central conveyor system control is provided that is connected with the control unit(s) by way of data lines and is designed in order to control the control unit(s) in such a way that specified piece goods are conveyed from a starting address to a target address especially from a starting address that lies in an area of the conveyor system controlled by a first control unit to a target address that lies in an area of the conveyor system controlled by a second control unit. Such a central conveyor system control processes—in contrast to the previously explained control units—no signals received directly from the peripheral devices, but rather data that is generated by the control units from these signals that are sent directly. The central conveyor system control is used to determine logistical characteristic values of the conveyor system and provide them to a user. Such logistical characteristic values are, for example, the assignment of the current location for each specific item found in the conveyor system, the identification of individual piece goods that are located at a specific location, the signaling of error states, for example conveyor blockages, and other characteristic values prepared from this data, for example the number of piece goods of a specific type present within the conveyor system or in a specific storage area of the conveyor system or a target-actual comparison that is often used, for example for conveyor systems used in storage, regarding the number of piece goods provided and present of a specific type within the conveyor system. If several control units are present, the central conveyor system control can also handle the function of the signal exchange between the multiple control units, in order to hereby handle the coordination of different conveyor system areas, each of which is controlled by a different control unit. In this case, if multiple control units are provided, a direct signal exchange between these control units can be dispensed with and instead of this, a star-shaped signal line structure can be provided with the central conveyor system control as its center point.

According to another preferred embodiment at least one modem, and preferably multiple modems, has/have an interface, especially a standardized interface, that is designed to output data and/or energy that is read out/taken by the modem from the bus line or that is sent to the modem by an external sensor or a sensor integrated in a conveyor. Such a standardized interface, for example an RS232 or an RS485 connection can be used, on one hand, to connect the modem with a peripheral device and to hereby realize both the energy transfer and the data transmission. In such a case, with appropriate design of the peripheral devices, for example sensors or actuators, a standardized modem can be provided that connects a number of different peripheral devices by way of a standardized interface to the control unit of the conveyor system. In this case, the standardized interface in addition to the coupling to the bus line can especially be the only connecting point of the modem, since in this way, the basic principle tasks of the modem can be implemented. However, the standardized interface can also be provided, in addition to the previously explained functions of the modems. In this case, the standardized interface makes possible the connection of one or several other peripheral devices to the modem. For example, in such a design a modem that is connected to a conveyor motor via a first connecting point, in order to connect it to the control unit via the bus line, can be connected to the modem by way of one or more additionally provided standardized interface sensors, which are also connected to the control unit by means of modem via the bus line and possibly receive energy via the modem. According to a third functionality, the standardized interface can also especially be used to check the status of the modem and its function and/or the function of the bus line in the area between control unit and modem. This functionality can especially be used in order to check the overall function in the course of the setup or changeover of a conveyor system, or if an error occurs within the conveyor system, to find the cause of the error in a short time in that the standardized interface is connected to an analysis instrument.

According to another preferred embodiment at least one modem, and preferably several modems, has/have a channel, in order to take one of the two line sections as primary conductor, and in the area near or around this channel at least one secondary coil inside the modem, which is coupled electromagnetically or inductively with the primary conductor. This design of the modem(s) is especially suitable for data and energy transfer that occurs without electrical contact, i.e. without direct electrically conductive contact, between the modem and the bus line. Such a design, on one hand, makes the setup and changeover easier, since an insulation of the line sections within the bus line can be dispensed with during the installation of a modem and new insulation is not required during removal of a modem. In addition, with this further development the installation of a modem to the bus line can be carried out without tools, which is advantageous for the speed of a setup or changeover. In principle, an adequately safe and powerful energy and data transmission can be achieved in a number of applications if only one of the two line sections within the channel is used, which makes an electromagnetic or inductive coupling to the secondary coil inside the modem possible, and also the energy transfer due to such a coupling is often sufficient.

In a few specific applications, it can be advantageous to keep both line sections of the bus line in separate channels inside the modem and to couple them electromagnetically or inductively with one secondary coil or two appropriately connected separate secondary coils in order to hereby make possible a higher energy transfer.

In this case, it is especially provided that the channel and/or the channels are each designed with a ferrite core open on at least one side, around which in at least one area a secondary winding is wound for design of the respective secondary coil. This design has proven to be especially efficient for the transfer of both energy and also data and makes possible a secure, i.e. error-free, data transmission.

Another aspect of the invention is an energy supply and data transfer device for a conveyor system according to one of the preceding claims, comprising:
  preferably a serial bus line comprising, especially consisting of two preferably linear line sections,
  at least one control unit that is connected to the bus line for sending data,
  a number of modems,
    which can preferably be connected without contact with the bus line in order to tap electrical energy from the bus line, read data out from the bus line and preferably also to modulate alternating voltage data present in the bus line or to modulate this to alternating voltage and
    that have an interface for connection with an external consumer, especially a conveyor motor or an actuator and/or an external sensor.

The energy supply and data transfer device according to the invention provides an improved energy supply and data transfer in a conveyor, which is especially suitable for use in a conveyor system as was previously described and makes possible all the advantages previously described in such a conveyor system.

The energy supply and data transfer device according to the invention can especially be further developed in that the control unit(s) provided therein, one or more of the modems provided therein and/or the bus line provided therein is/are further developed in a way that was previously described with reference to the conveyor system, in order to hereby achieve the effects and advantages described above.

Another aspect of the invention is a method for conveyance of piece goods, with the steps
Application of an electrical alternating voltage to a primary conductor,
Modulation of a data signal in/to the electrical alternating voltage,
Inductive transfer of the electrical alternating voltage to a secondary winding in a modem and conducting of the current generated in the secondary winding to a conveyor motor for driving the conveyor motor,
Reading the data signals out from the primary conductor in the modem and conduction of the data signals to the conveyor motor for controlling and/or regulating the conveyor motor,
Conveyance of the items with the conveyor motor.

With this method according to the invention, a more efficient and simultaneously safer, and, with respect to the connection and the installation of a conveyor motors, simpler use and operation of a conveyor motor within one conveyor system is made possible. The method can especially be performed within one conveyor system of the previously described construction type and in this case makes it possible to supply the conveyor motor both with energy and with the control and regulating signals necessary for its operation, without a complicated energy and data conduction via several lines being necessary.

The method can especially be further developed, in that it also comprises the steps:
Detection of a position of the item and/or of a characteristic of the item with a sensor,
Conduction of the sensor signals to a modem, especially to the modem that is designed for tapping the drive energy for the conveyor motor,
Modulation of the sensor signal to the alternating voltage present in the bus line in the modem,
Reading the sensor signal out of the bus line in the control unit and
Determination of the data signal for control/regulation of the conveyor motor depending on the sensor signal in the control unit.

With this further development, in addition to the efficient and safe operation of a conveyor motor, additionally an efficient and secure detection of the position of an item is made possible by means of a sensor and this position or the characteristic of the item is sent in a secure and efficient manner to a control unit in the form of data that describes the position/characteristic. In this case, the modem, which modulates the data using the position/characteristic on the bus line, may be a separate modem or a modem that connects a conveyor motor to the bus line. This further development of the method is especially suitable for operation with a conveyor system that is designed according to the previously described preferred embodiments with a sensor coupling or a standardized interface.

Figure 2:
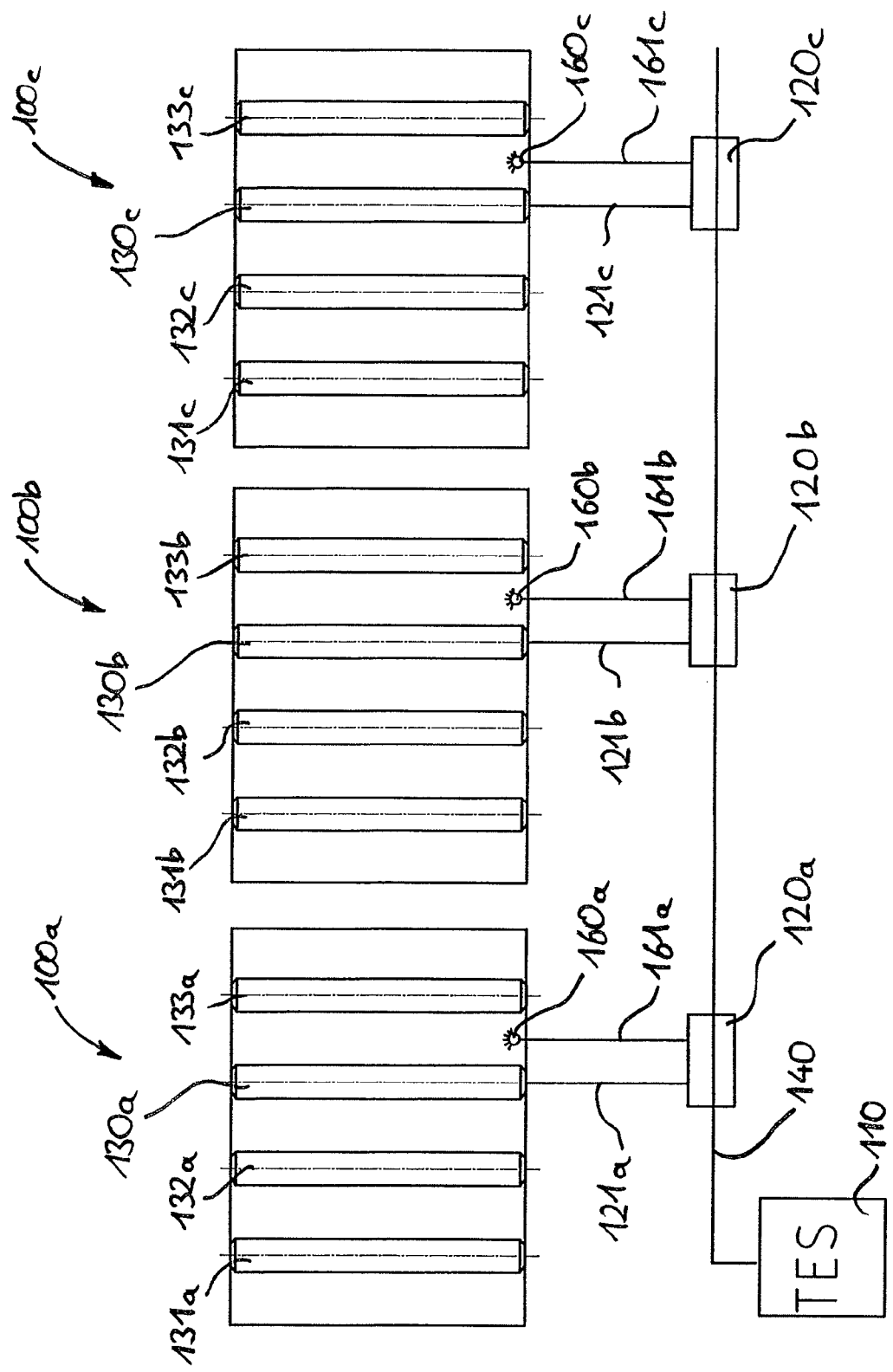
Figure 3:
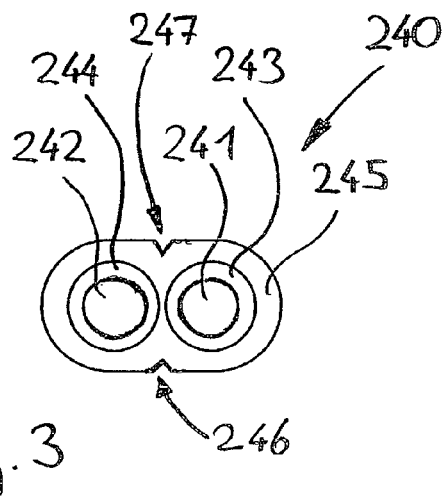
Figure 4:
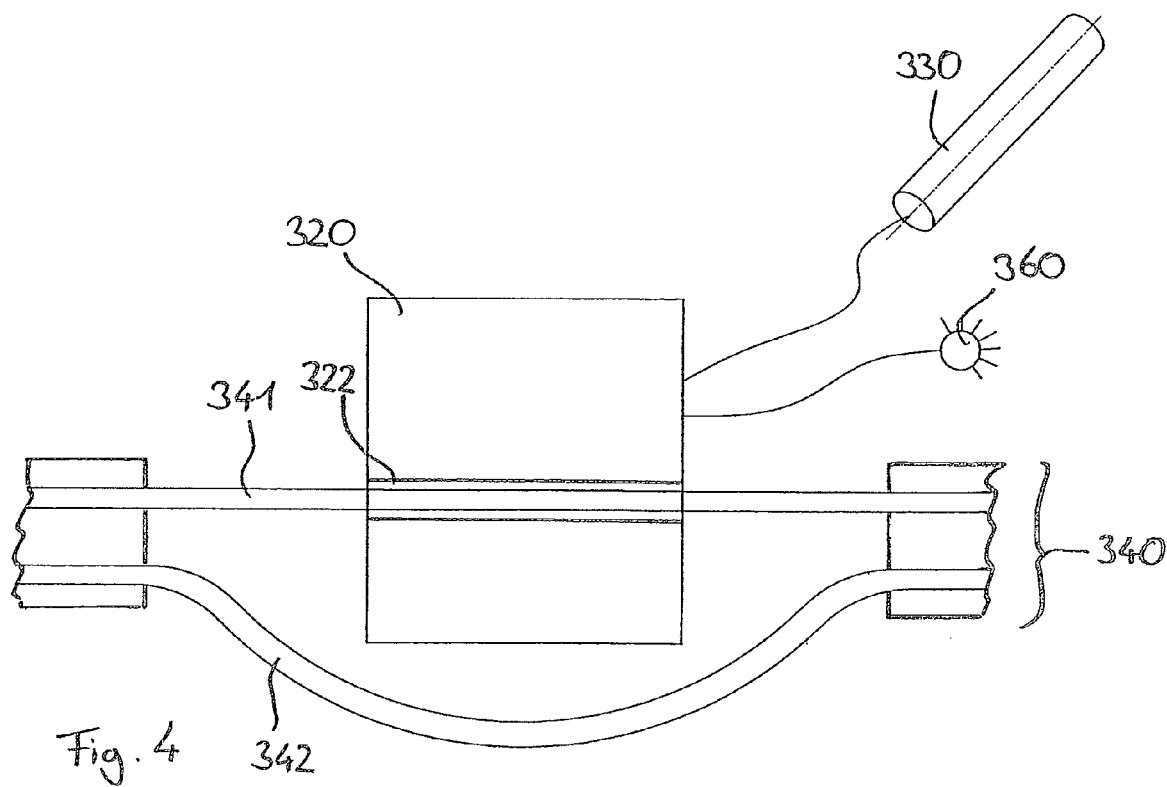
Figure 5:
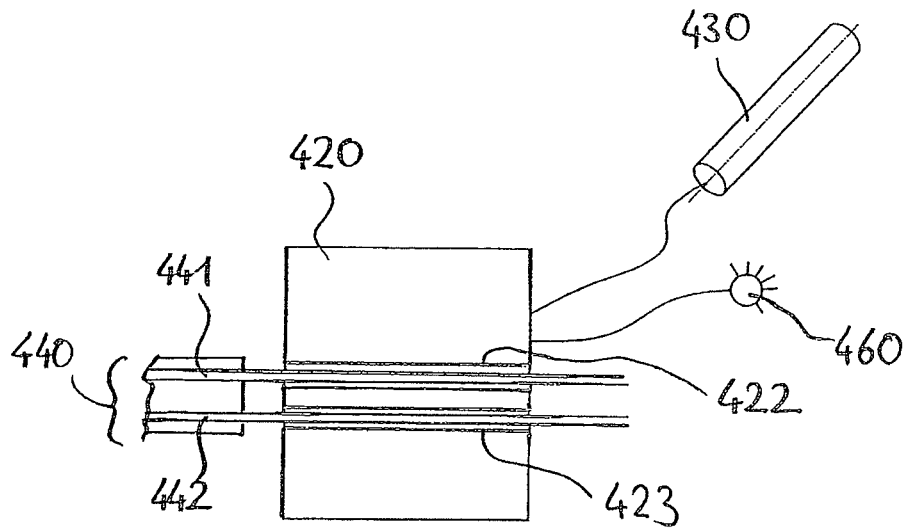
Figure 6:
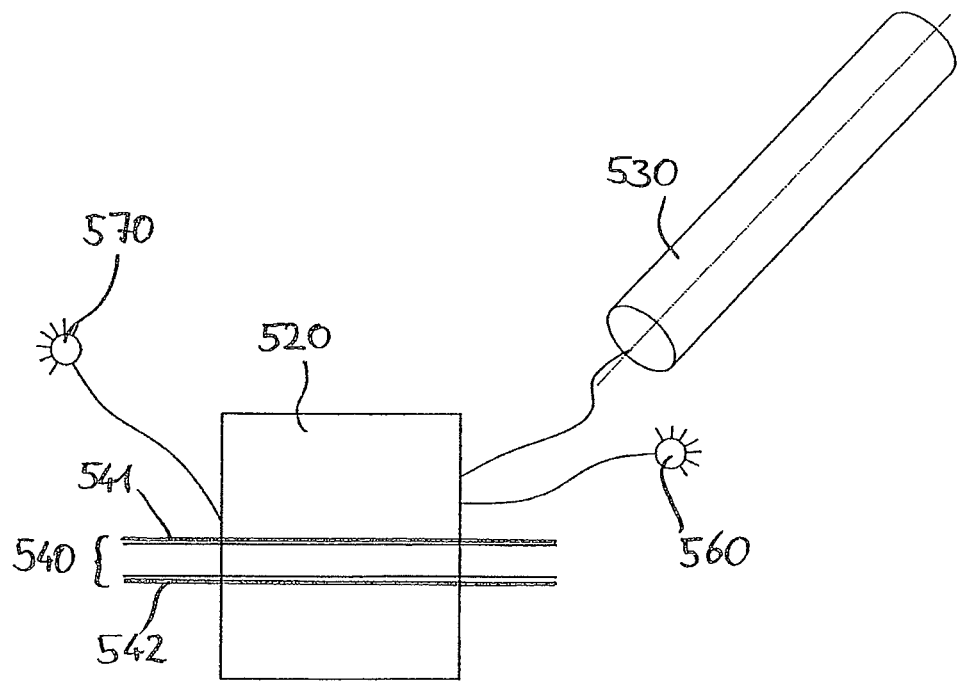
Figure 7:
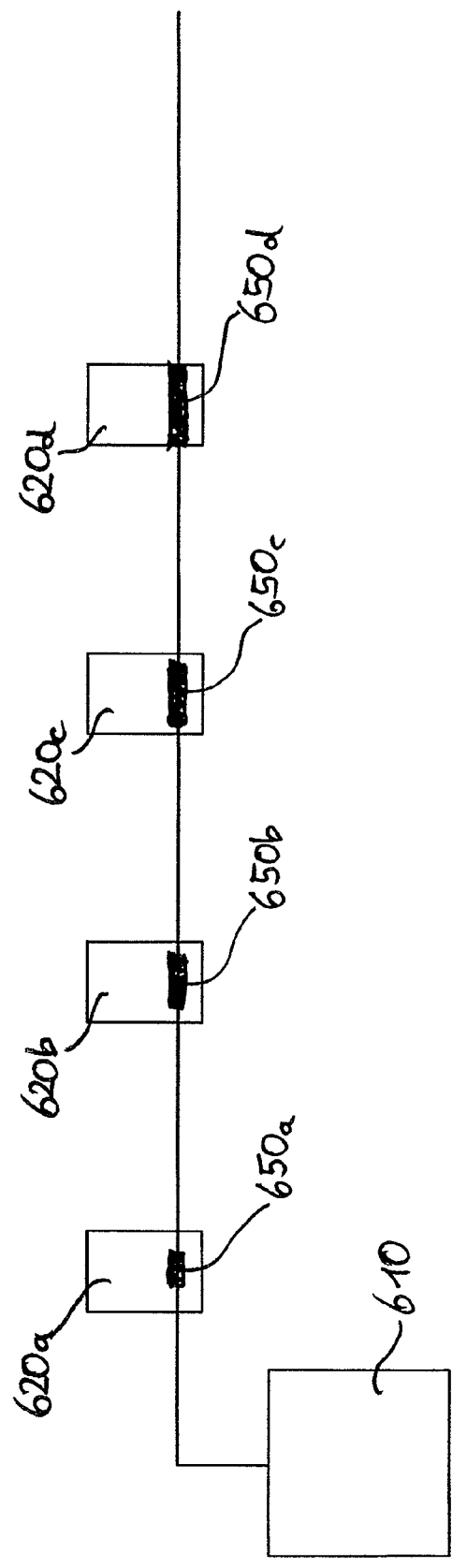
Figure 8:
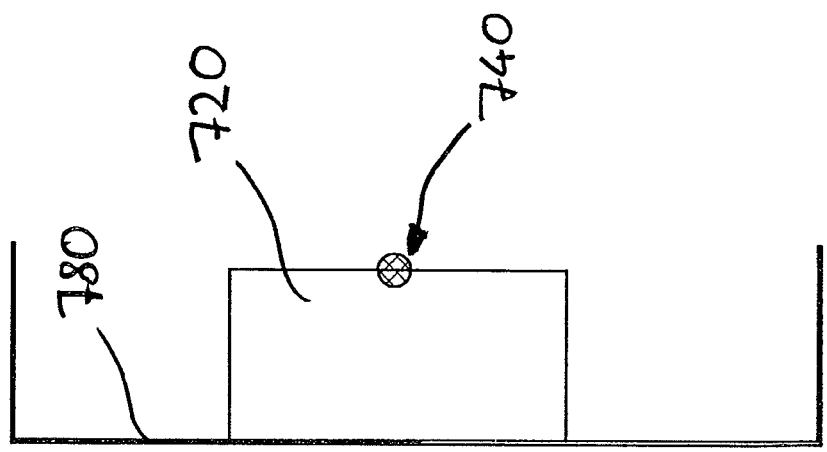

Preferred embodiments of the invention will be described with the use of the attached figures. In the figures:

FIG. 1 shows a schematic representation of a first embodiment of the conveyor system according to the invention, FIG. 2 shows a schematic representation of a second embodiment of the conveyor system according to the invention, FIG. 3 shows a cross section view of a bus line of the conveyor system according to the invention, FIG. 4 shows a schematic view of a modem that is coupled to a bus line and connects a conveyor motor and sensor to the bus line, FIG. 5 shows a schematic representation of a second embodiment of a modem that is coupled to a bus line and couples a conveyor motor and a sensor to this bus line, FIG. 6 shows a schematic representation of a third embodiment of a modem, which is coupled to a bus line and a conveyor motor and couples two sensors to the bus line, FIG. 7 shows a schematic representation of a third embodiment of a conveyor system according to the invention, and FIG. 8 shows a schematic representation of the arrangement of the bus line according to the invention using a conveyor profile of a conveyor system according to the invention.

As can be seen from FIG. 1, a first embodiment of the conveyor system according to the invention comprises a control unit 10 and a number of modems 20a-d. Each modem 20a-d is connected to a conveyor motor 30a-d by means of a multi-core line 21a-d designed for data and energy transfer.

Starting from the control unit 10, a serial bus line 40 runs along the modems 20a-d and has a defined closed end 41. The bus line 40 is coupled without electrical contact to each of the modems 20a-d via coupling paths 50a-d.

FIG. 2 shows an embodiment of the invention that has a number of conveyor units 100a-c. Each conveyor unit 100a-c has a conveyor motor that is designed as a conveyor roller with integrated drive motor 130a-c. In addition, each conveyor unit 100a-c comprises a number of conveyor rollers 131-133a-c that are used to record the weight of piece goods that will be conveyed by the conveyor units 100a-c and to make possible easy movement of these piece goods along the conveyor units.

Each conveyor motor 130a-c is in turn connected, by means of an energy and data line 121a-c to a modem 120a-c, which in turn is connected to a bus line 140 by inductive coupling.

Each conveyor unit 100a-c also has a sensor 160a-c that is connected by means of an energy and data line 161a-c to the modem 120a-c.

By way of the coupling of the modem 120a-c to the bus line 140, both the energy and the data are transferred, which are required for operation and control of the conveyor motors 130a-c and the sensors 160a-c, i.e., by way of the coupling of modems 120a-c to the bus line 140, both a signal transmission from the control unit 110 to the conveyor motor and possibly also to the sensor 160a-c is implemented, as well as a signal transmission in the reverse direction in order to send status signals of the conveyor motor and sensor signals of the sensor 160a-c to the control unit 110.

FIG. 3 shows a bus line for use in the conveyor system according to the invention. As can be seen, the bus line 240 comprises a first conductor 241 and a second conductor 242. Each conductor 241, 242 is electrically insulated by means of an insulating jacket 243, 244. The two conductors 241, 242, together with their insulating jacket 243, 244 are embedded in a shroud 145 that is also electrically insulating and mechanically protective. The shroud 245 has longitudinal grooves 246, 247 that make it possible to separate the shroud 245 centrally in the longitudinal direction between the two insulated conductors 241, 243 and 242, 244. In this way, a separable two-core data line is provided as a bus line, which can be connected to a modem in a simple way.

FIG. 4 shows a coupling situation of a modem 320 to a bus line 340. As can be seen, the bus line 340 is divided into two strands that run separately in front of and behind the modem by separation into two insulated conductors 341, 342. A first line section 341 runs through a channel 322 formed on the modem 320 and is coupled with the modem in this way for signal transmission. The other line section 342 is routed in an arc around the modem and is not coupled with the modem.

The modem shown in FIG. 4 is designed for signal and energy transfer from the bus line to a conveyor motor 330 and a sensor 360 and for signal and energy transfer from the conveyor motor 330 and the sensor 360 to the bus line 340.

FIG. 5 shows a second design of a modem 420, which is coupled to a bus line. As can be seen from FIG. 5, the modem 420 is also used to couple a conveyor motor 430 and a sensor 460 to the bus line 440. As a deviation from FIG. 4, in FIG. 5 not only one of the line sections of the bus line 440 is guided through the modem, but rather both line sections 441, 442 run in appropriately separated coupling channels 422, 423 through the modem and are both used separately for energy and data transmission with higher power and/or bandwidth.

FIG. 6 shows another embodiment of a modem for a conveyor system according to the invention. As can be seen, the modem 520 is used to couple a conveyor motor 530 and two sensors 560, 570 to a bus line 540. As in FIG. 5, both line sections 541, 542 are guided through the modem for the purpose of coupling. In the embodiment according to FIG. 6 the conveyor motor is designed as a high-power drum motor with 400 V supply voltage and in this case, it is especially preferred to implement the energy supply of the 400-V drum motor by coupling to both bus line strands.

FIG. 7 shows another design of the conveyor system according to the invention in a schematic representation. A control unit 610 is also provided that is coupled with a number of peripheral devices by means of a bus line 640 provided with a defined closed end, in that it is implemented with one or both line sections through a coupling channel/coupling channels designed inside modems 620a-d.

In the embodiment shown in FIG. 7, voltage of 10,000 Volts with a frequency of 25 kHz is present in the bus line and the first modem 620a is designed in order to couple a peripheral device with 24 V supply voltage to the bus line 640. The second modem 620b is designed to couple a peripheral device with 48 V supply voltage to the bus line. The third modem 620c is designed in order to couple a peripheral device with 230 V supply voltage to the bus line 640 and the fourth modem 620d is designed to couple a peripheral device with 400 V supply voltage to the bus line 640. Each of the modems 620a-d is designed in such a way that the energy required for the supply of the respective peripheral devices is taken from the bus line 640 and, for this purpose, the coupling path 650a-d is designed within the modem in such a way that the corresponding supply voltage can be taken from the bus line 640. This is understood to mean that all modems can be designed in such a way that in each case one line section of the bus line is guided through the modem in a coupling channel. In addition, all modems can be designed in such a way that both line sections can be guided in respective separated channels through the respective modem in order to implement the coupling. However, it can especially also be provided that both line sections are guided through two corresponding channels inside the modem in only some of the modems and in other modems, especially those with lower supply voltage, only one line section of the bus line is guided through the modem.

Finally, FIG. 8 shows a preferred embodiment of the arrangement of a modem 720 with respect to the conveyor profile 780 of a conveyor system according to the invention. Here the conveyor profile 780 is designed as a horizontally extending U profile with U shanks pointing to the side and is used to fasten conveyor rollers or conveyor motors mechanically. In the design shown, the modem 720 is mounted on the inside of the U profile and a bus cable 740 is placed in a corresponding placement groove of the modem for coupling.

The invention claimed is:

1. Conveyor system for conveying individual piece goods, comprising:
   a number of conveyor motors;
   at least one control unit that is connected to each conveyor motor for sending data for regulating and/or controlling the conveyor motors;
   wherein at least one control unit is connected via a bus line to at least one conveyor motor, the bus line being connected without direct conductive electrical contact to at least one modem, and wherein the at least one modem is designed to take energy for driving the conveyor motors and at least one data signal for control or regulation of the conveyor motor from the bus line and supply it to the conveyor motor,
   further wherein the conveyor motors, the at least one control unit, the bus line, and the at least one modem are mounted stationary within the conveyor system,
   wherein a configurable modem that has a coupling part that is designed to read energy and signals out from the bus line and to feed signals into the bus line and has a configurable connecting part that is configurable, in order to bring the energy and/or the signals for a consumer or sensor into the form required by the consumer or sensor,
   wherein the configurable modem is connected inductively to the bus line for transfer of the drive energy of the conveyor motor and the effective coupling length of the coupling is changeable to adjust the voltage of the drive energy transferred inductively from the bus line, and
   wherein the modems are inductively connected to the bus line for the transfer of the drive energy of the conveyor motor and the inductive coupling of a first modem for transfer of an electrical drive energy with a first voltage and the inductive coupling of a second modem for transfer of an electrical drive energy with a second voltage that is different from the first.

2. Conveyor system according to claim 1,
   further comprising at least one sensor for detecting items in an area of the conveyor system, that is connected with the control unit via a modem for sending the sensor data, the modem being designed in order to couple at least one sensor signal to an alternating voltage present in the bus line or to modulate the sensor signal to the alternating voltage.

3. Conveyor system according to claim 2,
   wherein the at least one modem is designed to take the energy for driving and at least one data signal for the control or regulation of the conveyor motors from the bus line, and to couple at least one sensor signal to an alternating voltage pre-sent in the bus line or to modulate the sensor signal to the alternating voltage.

4. Conveyor system according to claim 1,
   wherein the bus line comprises two line sections electrically insulated from each other, by which the drive energy can be sent to conveyor motors, through at least one modem which connects to the bus line by inductive coupling to an alternating voltage present in the line sections, and to read out the signals required for controlling and/or regulating the conveyor motor modulated to the alternating voltage in the line sections.

5. Conveyor system according to claim 1,
   wherein at least one modem connects an electronically commutated conveyor motor with the bus line, and wherein a commutation and control unit is provided that is designed to generate signals for the commutation of the conveyor motor from a rotational angle signal received from the conveyor motor and/or from the bus line, wherein the at least one modem is designed to feed status signals that characterize an operating state of the conveyor motor.

6. Conveyor system according to claim 1,
wherein the conveyor motor is electronically commutated, a commutation control is assigned to each motor, which receives a speed signal from the control unit, and the modem is designed to read the speed signal out from the bus line and send it to the commutation control.

7. Conveyor system according to claim 1,
wherein the configurable modem is designed to take electrical energy from the bus line and has an actuating element to adjust the voltage of this electrical energy and/or that the configurable modem is designed to take a data signal from the bus line and has an actuating element to adjust the voltage range and/or frequency range of this data signal.

8. Conveyor system according to claim 1,
wherein at least two control units are provided, each of which is connected via its own bus line to several conveyor motors and which are connected to each other by means of a data line for controlling the conveyor system.

9. Conveyor system according to claim 1,
wherein the at least two control units are designed to exchange signals via the control data line that relate to an item that is conveyed from an area of the conveyor system controlled by a first control unit to an area of the conveyor system controlled by a second control unit.

10. Conveyor system according to claim 1,
wherein a central conveyor system control that is connected to the control unit(s) via data lines and is designed to control the control unit(s) such that specific piece goods can be conveyed from a starting address to a target address.

11. Conveyor system according to claim 1,
wherein at least one modem has an interface that is designed in order to read out data and/or energy that is sent to the modem from the bus line or from an external sensor or a sensor integrated in a conveyor motor.

12. Conveyor system according to claim 4,
wherein at least one modem has/have a channel to take one of the two line sections as the primary conductor and at least one secondary coil is mounted in the area of or inside the modem, which is coupled electromagnetically or inductively with the primary conductor.

13. Conveyor system according to claim 4,
wherein the modem is designed in order to take both line sections as primary conductors, each in one channel and to couple electromagnetically or inductively to respective secondary coils.

14. Conveyor system according to claim 12,
wherein the channel is formed by a ferrite core with at least one side open, around which a secondary winding is wound in at least one area for the design of the secondary coil.

15. Energy supply and data transfer device for a conveyor system according to claim 1, comprising:
a bus line comprising two linear line sections;
at least one control unit that is connected to the bus line for sending data;
a plurality of modems;
that are configurable to be connected to the bus line without contact in order to take electrical energy from the bus line and read data out from the bus line; and
that have an interface for connection to an external consumer, wherein the conveyor motors, the at least one control unit, the bus line, and the at least one modem are mounted stationary within the conveyor system,
wherein a configurable modem that has a coupling part that is designed to read energy and signals out from the bus line and to feed signals into the bus line and has a configurable connecting part that is configurable, in order to bring the energy and/or the signals for a consumer or sensor into the form required by the consumer or sensor,
wherein the configurable modem is connected inductively to the bus line for transfer of the drive energy of the conveyor motor and the effective coupling length of the coupling is changeable to adjust the voltage of the drive energy transferred inductively from the bus line, and
wherein the modems are inductively connected to the bus line for the transfer of the drive energy of the conveyor motor and the inductive coupling of a first modem for transfer of an electrical drive energy with a first voltage and the inductive coupling of a second modem for transfer of an electrical drive energy with a second voltage that is different from the first.

16. Method for the conveyance of piece goods, comprising:
applying an electrical alternating voltage to a primary conductor in a bus line;
modulating a data signal to the electrical alternating voltage;
transferring by induction of the electrical alternating voltage to a first secondary winding in a first modem and conducting the current generated in the secondary winding to a first conveyor motor for driving the first conveyor motor at a first voltage;
reading the data signal out of the primary conductor in the first modem and conducting the data signal read to the first conveyor motor for controlling and/or regulating the first conveyor motor;
transferring by induction of the electrical alternating voltage to a second secondary winding in a second, configurable modem and conducting the current generated in the second secondary winding to a second conveyor motor for driving the second conveyor motor at a second voltage;
reading the data signal out of the primary conductor in the second, configurable modem and conducting the data signal read to the second conveyor motor for controlling and/or regulating the second conveyor motor; and
conveying the items with the conveyor motor, wherein the conveyor motors, the bus line and the first and the second, configurable modem are mounted stationary within the conveyor system,
wherein said second, configurable modem reads energy and signals out from the bus line and to feed signals into the bus line using a coupling part that is configured to bring the energy and the signals for the second conveyor motor into the form required by the second conveyor motor,
wherein the first and the second, configurable modem are inductively connected to the bus line for the transfer of the drive energy of the conveyor motor and an inductive effective coupling length of said first modem for transfer of an electrical drive energy is different from an inductive effective coupling length of said second, configurable modem for transfer of an electrical drive energy such that said second voltage is different from said first voltage.

17. Method according to claim 16, further comprising:
  detection of the position of the item and/or of a characteristic of the item with a sensor,
  conduction of the sensor signal to a modem, especially to the modem that is designed for tapping the drive energy for the conveyor motor,
  modulation of the sensor signal to the alternating voltage present in the bus line in the modem,
  reading the sensor signal out from the bus line in the control unit and
  determination of the data signal for control/regulation of the conveyor motor depending on the sensor signal in the control unit.

18. Conveyor system according to claim 13,
  wherein the channel is formed by a ferrite core with at least one side open, around which a secondary winding is wound in at least one area for the design of the secondary coil.

19. Conveyor system according to claim 1, wherein each of the number of conveyor motors is connected to a bus line to via a modem that is connected to the bus line without direct conductive electrical contact.

20. Conveyor system according to claim 3, wherein each modem is designed to take the energy for driving and at least one data signal for the control or regulation of the conveyor motors from the bus line, and to couple at least one sensor signal to an alternating voltage pre-sent in the bus line or to modulate the sensor signal to the alternating voltage.

21. Conveyor system according to claim 3, wherein at least one modem is designed to take the energy for driving and at least one data signal for the control or regulation of the conveyor motors from the bus line, and couple each sensor signal to an alternating voltage pre-sent in the bus line or to modulate the sensor signal to the alternating voltage.

22. Conveyor system according to claim 5, wherein the at least one modem designed to feed status signals that characterize an operating state of the conveyor motor, feeds status signals relating to its speed and/or load status to the bus line.

23. Conveyor system according to claim 10, wherein specific piece goods are conveyable from a starting address that lies in an area of the conveyor system controlled by a first control unit to a target address that lies in an area of the conveyor system controlled by a second control unit.

24. Energy supply and data transfer device according to claim 15, wherein the number of modems can further modulate data into alternating voltage present in the bus line or modulate to the alternating voltage.

25. Energy supply and data transfer device according to claim 15, wherein the interface for connection to an external consumer is operable to interface with a conveyor motor, an actuator, and/or an external sensor.

\* \* \* \* \*

UNITED STATES PATENT AND TRADEMARK OFFICE
CERTIFICATE OF CORRECTION

| | | |
|---|---|---|
| PATENT NO. | : 8,952,568 B2 | Page 1 of 1 |
| APPLICATION NO. | : 13/203224 | |
| DATED | : February 10, 2015 | |
| INVENTOR(S) | : Georg H. Malina et al. | |

It is certified that error appears in the above-identified patent and that said Letters Patent is hereby corrected as shown below:

On the Title page of the patent, item (73) Assignees, please replace "Sew-Eurodrive Gmgh & Co. KG (DE)" with --Sew-Eurodrive Gmbh & Co. KG (DE)--.

Signed and Sealed this
Sixteenth Day of June, 2015

Michelle K. Lee
*Director of the United States Patent and Trademark Office*